C. C. GRAY.
MUD HOOK CLAMP.
APPLICATION FILED JULY 20, 1916.
1,240,703.
Patented Sept. 18, 1917.
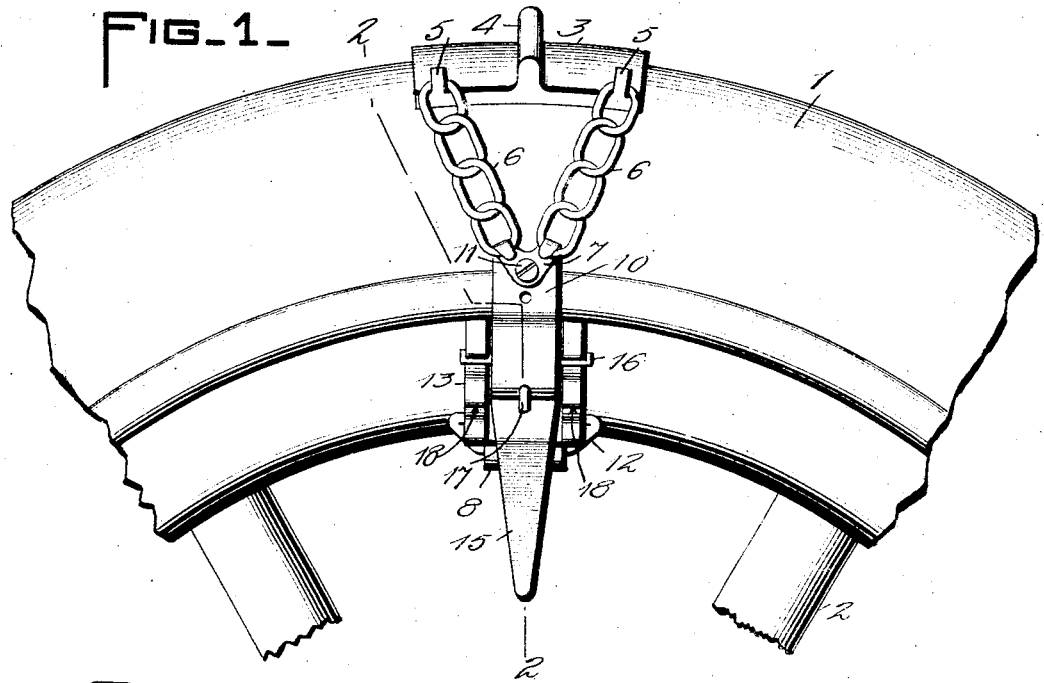
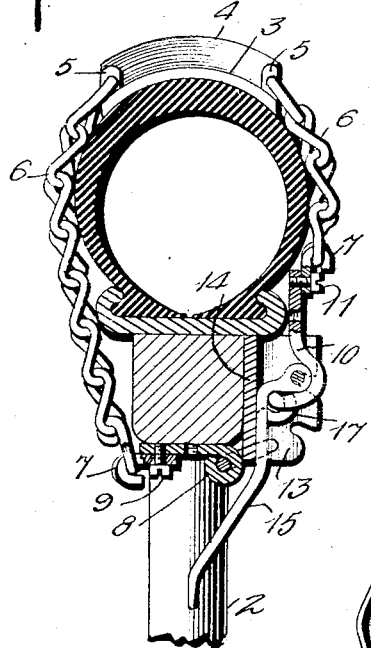
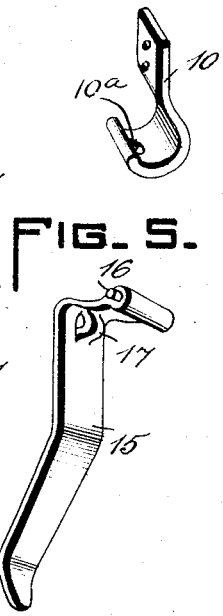
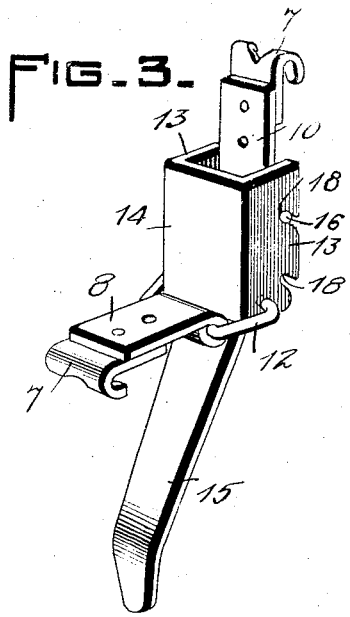
WITNESSES
INVENTOR
CARL C. GRAY,
BY
ATTORNEYS

UNITED STATES PATENT OFFICE.

CARL C. GRAY, OF WAPAKONETA, OHIO.

MUD-HOOK CLAMP.

1,240,703. Specification of Letters Patent. Patented Sept. 18, 1917.

Application filed July 20, 1916. Serial No. 110,291.

*To all whom it may concern:*

Be it known that I, CARL C. GRAY, a citizen of the United States, and a resident of Wapakoneta, in the county of Auglaize and State of Ohio, have invented an Improvement in Mud-Hook Clamps, of which the following is a specification.

My invention is an improvement in mud hook clamps, and has for its object to provide means of the character specified, for attaching mud hooks to the wheel of a motor vehicle, in such manner that they will be held firmly in place during the movement of the vehicle, while at the same time they may be easily attached to or detached from the wheel.

In the drawings:

Figure 1 is a side view of a portion of the wheel provided with the improved clamp.

Fig. 2 is a section on the line 2—2 of Fig. 1.

Fig. 3 is a perspective view of the releasable clamping mechanism.

Fig. 4 is a perspective view of the hooked plate.

Fig. 5 is a similar view of the lever.

The present embodiment of the invention is shown in connection with the tire 1 of a wheel 2, and the mud hook consists of an arch plate 3 having a transverse holding rib 4 on its convex surface, the said plate being shaped to fit the periphery of the tire, and having at each corner a perforated lug 5.

These lugs are engaged by chains 6, and the chains at each side of the tire converge to a connection with a double hook 7. One pair of the chains 6 is of greater length than the other pair, and the double hook 7 to which they are connected is connected to a plate 8, by means of a screw 9. The other hook 7 is connected to a hooked plate 10, by means of a screw 11, and the plates 8 and 10 are adapted to be releasably connected in a manner to be presently described.

The hooked plate 10 is provided with two openings for receiving the screw 11, to permit some adjustment with respect to the hooked plate 10, and the plate 8 is similarly provided with two openings for receiving the screw 9, and the heads of the said screws are so arranged with respect to the hooks of the double hooks 7, that the said heads will prevent disengagement of the chains from the hooks.

The plate 8 has a bearing at the end remote from the screw 9, and this bearing is engaged by the body of a clip 12, whose arms are pivotally connected with the side walls 13 of a channel or U-shaped plate consisting of the said side walls and a body 14.

A locking lever 15 is provided, and the said lever is an elbow lever having a long arm and a short arm, and having at the opposite sides of the outer end of the short arm outwardly extending pintles or turning pins 16, having at the junction of the arms an eye 17, which is engaged with an opening 10$^a$ in the hook of the hooked plate 10. The elbow lever is thus pivotally connected with the hooked plate, in such manner that the short arm of the lever will extend into the hook. The side walls 13 of the channel plate 13—14 have registering notches 18, for receiving the pintles 16 of the locking lever.

In use the device is arranged as shown in Figs. 1 and 2, with the mud hook 3 on the tread of the tire. The channel plate 13—14 connected to the ends of the long pair of chains is passed inwardly around the felly, with the plate 8 bearing against the inner face of the felly, and with the channel plate bearing against the opposite side face of the felly from the pair of long chains 6. With the lever 15 swung outwardly, so that the end of the short arm provided with the pintles 16 is separated from the hook, the said lever and the hook are swung into the channel plate between the side walls thereof, and the pintles 16 are engaged with one series of openings 18. The lever is now swung inwardly into the position of Fig. 2, and it will be evident that the parts will be locked in this position. It will be noticed that the tip of the lever 15 is offset inwardly toward the plane of the wheel with respect to the body portion, and that the said body portion engages the body of the channel plate.

Six degrees of adjustment are permitted, namely two at the screw 11, two at the screw 9, and two at the notches 18.

It will be understood that as many mud hooks may be connected with the wheel as may be desired.

I claim:

A tightener for chains and the like comprising a channel plate, a hook, an elbow lever pivoted to the bill of the hook at the junction of the arms of the lever and having one of its arms adapted to engage within the bill of the hook, said arm having outwardly extending pintles, and the side walls of the channel plate being notched for engagement by the pintles, said channel plate being adapted for connection with one end of the chain and the hook with the other end.

CARL C. GRAY.

Witnesses:
J. BURTON WELLS,
G. R. WELLS.